United States Patent [19]

Sakamoto

[11] 4,229,773
[45] Oct. 21, 1980

[54] VIDEO SIGNAL RECORDING SYSTEM WITH AUTOMATIC HEAD POSITIONING

[75] Inventor: Hitoshi Sakamoto, Zama, Japan

[73] Assignee: Sony Corporation, Tokyo, Japan

[21] Appl. No.: 967,100

[22] Filed: Dec. 7, 1978

[30] Foreign Application Priority Data

Dec. 12, 1977 [JP] Japan .......................... 52-148062

[51] Int. Cl.³ .............................................. G11B 21/10
[52] U.S. Cl. ......................................... 360/70; 360/77
[58] Field of Search ................ 360/70, 77, 14, 107, 360/109, 10, 11

[56] References Cited

U.S. PATENT DOCUMENTS

| 4,099,211 | 7/1978 | Hathaway | 360/109 |
| 4,143,405 | 3/1979 | Kubota | 360/10 |
| 4,151,569 | 4/1979 | Hathaway | 360/77 |
| 4,151,570 | 4/1979 | Ravizza et al. | 360/77 |

FOREIGN PATENT DOCUMENTS

| 2757400 | 6/1978 | Fed. Rep. of Germany | 360/77 |
| 4526802 | 6/1966 | Japan | 360/10 |

Primary Examiner—Bernard Konick
Assistant Examiner—Donald McElheny, Jr.
Attorney, Agent, or Firm—Lewis H. Eslinger; Alvin Sinderbrand

[57] ABSTRACT

An apparatus for recording and reproducing a video signal in successive parallel track sections on a moving recording medium includes a rotary head assembly having a movable recording-reproducing head whose tracking position can be adjusted in the direction transverse to the length of the track sections, and a fixed auxiliary reproducing head which is in a following position in respect to the movable recording-reproducing head. During recording, the transverse position of the movable recording-reproducing head is corrected on the basis of the reproduced output of the fixed auxiliary head so as to be eventually in alignment with the path scanned by the latter.

11 Claims, 11 Drawing Figures

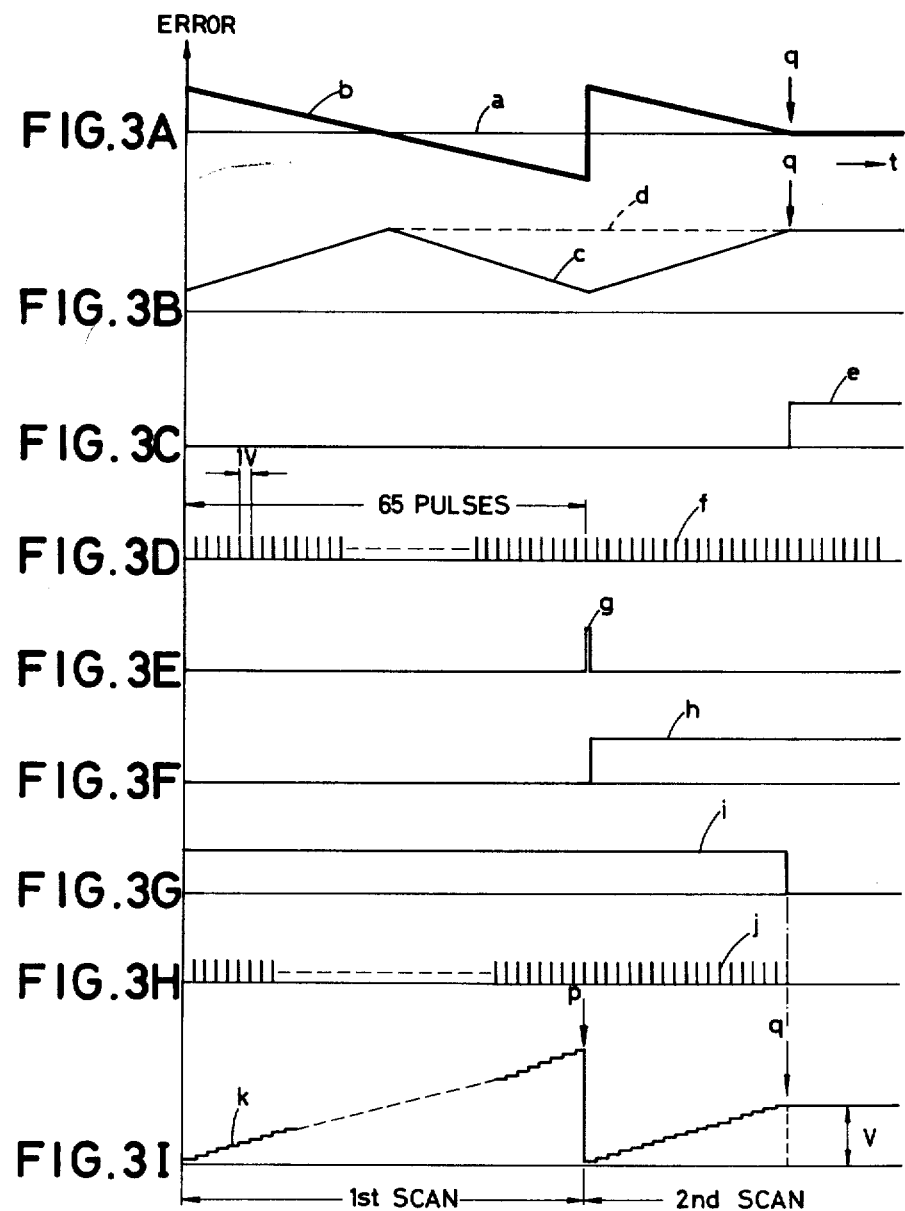

VIDEO SIGNAL RECORDING SYSTEM WITH AUTOMATIC HEAD POSITIONING

BACKGROUND OF THE INVENTION

1. Field of the Invention

This invention relates to a video signal recording system, and more particularly to an automatic tracking control apparatus in a system for recording a video signal in successive parallel track sections on a moving recording medium.

2. Description of the Prior Art

When a signal having a broad band such as a video signal is recorded on, and reproduced from a magnetic recording medium, such as, a magnetic tape, the relative speed between the magnetic recording medium and a magnetic transducer or head for scanning the magnetic recording medium should be high. Generally, the video signal is recorded in successive parallel track sections on the magnetic tape, with such parallel track sections being in skewed relation to the longitudinal direction of the magnetic tape. In the usual video tape recorder (VRT), the video signal of one field or one frame is recorded in one track section on the magnetic tape. Each recorded track section is narrow so as to decrease the amount of magnetic tape used per track section and thus to enable longer play. Further, the guard bands between adjacent track sections are made narrow or eliminated for the purpose of high density recording. For such a VTR, various auto-tracking control techniques have been developed for ensuring that, during reproducing, the magnetic head is automatically moved to an optimum tracking position.

In an existing automatic tracking system used during play-back operation of a VTR of the helical scanning type, the reproducing magnetic head is deflected in a direction transverse to the length of the track for maintaining the optimum tracking position in slow or still reproduction. Such accurate tracking of the reproducing magnetic head avoids guard band noise which is produced from the guard bands between adjacent tracks. In such automatic tracking system, the reproducing magnetic head is fixed on one end of an electromechanical transducer element, such as a bi-morph leaf in which two piezo-ceramic plates, for example, of $BaTiO_3$, $PbTiO_3$ or $PbNb_2O_6$ are laminated together. Control signals applied to the bi-morph leaf deflect the reproducing magnetic head in the transverse direction. The bi-morph leaf is light and strong, and its high speed response is excellent. However, it has some hysteresis and it becomes depolarized with age. Further, a damper for suppressing natural vibration of the bi-morph leaf assembly is normally arranged in contact with the bi-morph leaf plates. The damper may change its resilience with time. The circuits for energizing the electrodes of the bi-morph leaf assembly may also exhibit change with age.

For the above described reasons, it is difficult to accurately maintain the static home position of the bi-morph leaf assembly as the equipment ages. Thus, if recording operation is effected with the bi-morph leaf in its static home position and such position varies, the range of deflection of the bi-morph leaf may not be adequate during play-back or reproducing operation to achieve optimum tracking. A similar problem also exists in an auto-tracking apparatus of the moving-coil type in which the head position is controlled by a moving coil. Accordingly, in some VTRs, signals are recorded on the magnetic tape by means of a fixed magnetic head, and reproduction of such signals from the magnetic tape is effected by another magnetic head supported on the bi-morph leaf assembly.

When separate magnetic heads are used for recording and reproducing signals, respectively, with the recording head being fixed and the reproducing head being movable, as aforesaid, the picture is frequently deteriorated due to the difference in quality of the recording and reproducing magnetic heads. The requirement to compensate for this difference in quality results in increased cost. In addition, since the permissible range of the deflecting movement of the reproducing head is limited, such movement may not be sufficient to permit accurate tracking. Reproducing a tape on one VTR which was recorded on another VTR increases the tracking problem even further.

OBJECTS AND SUMMARY OF THE INVENTION

Accordingly, it is an object of this invention to provide a video signal recording apparatus which overcomes the above described disadvantages of the conventional video signal recording apparatus.

Another object of this invention is to provide a video signal recording apparatus in which signals can be recorded on, and reproduced from a recording medium by the same movable head.

It is a further object of this invention to electronically determine the optimum home position of the movable record-reproduce heat at the start of recording and to thereafter hold the record-reproduce head in the optimum position for the remainder of the recording operation.

According to an aspect of this invention, a video signal recording apparatus includes a movable recording-reproducing head and a fixed additional or auxiliary reproducing head which scans the track sections in which signals have been recorded by the movable recording head. The path of the fixed reproducing head along the recording medium defines an optimum track for recording and in which the signal recorded by the movable magnetic head should desirably be situated.

In a recording operation, the movable recording-reproducing head is initially driven in a first sweep through its entire range of transverse movement and the maximum signal output of the fixed auxiliary reproducing head is memorized. The movable recording-reproducing head is then returned to one extreme position and is driven in a second sweep toward the opposite extreme position. When the output of the fixed auxiliary reproducing head in the second sweep equals the memorized maximum output from the first sweep, the second sweep is stopped and the signal for deflecting or positioning the movable recording-reproducing head is thereafter maintained constant to lock the movable head into this home position for the remainder of the recording operation. Each time the VTR is turned on and begins a recording operation, this process may be repeated to establish the optimum home position.

In a preferred embodiment of the invention, a pulse generator operating synchronously with the rotary head assembly generates pulses, for example, at the rate of one pulse per rotation of the head assembly, and these pulses are counted in a counter. The output of the counter is D/A converted during recording and the resulting stepped increasing ramp voltage is applied to the bi-morph leaf supporting the movable recording-reproducing head thus deflecting or sweeping the latter through its entire range of transverse movement. While the movable recording-reproducing head is thus being fully deflected, it passes from a position of misalignment at one side of the optimum position, through the optimum position to a position of misalignment on the other side of the optimum position. The fixed auxiliary reproducing head reproduces the signals being recorded by the movable head and, as the latter passes through the optimum position, the signal output of the fixed auxiliary reproducing head attains a maximum and thereafter decreases. This maximum value of the head output during the first sweep by the movable head is memorized in a memory circuit. A second sweep by the movable head is begun from the original position. In the second sweep, the output of the fixed auxiliary reproducing head is compared with the memorized maximum output attained in the first sweep. During the second sweep, pulses from the pulse generator are again counted in the counter, D/A converted and applied to the bi-morph leaf supporting movable head. However, during the second sweep, when the output of the fixed auxiliary reproducing head equals the memorized maximum value from the first sweep, further counting by the counter is blocked and the number stored in the counter is permanently retained, at least so long as the VTR remains operative. Thus, the movable recording-reproducing head is placed and held in the optimum position for recording. A random access memory, optionally of the type which retains stored data when the power is turned off, may be provided to store the number of the counter when further counting by the latter is blocked. This permits operating the VTR without searching for and locking in to the optimum position for the movable head at the beginning of each recording session.

The fixed auxiliary reproducing head may also be used for monitoring the picture being recorded on the recording medium while recording.

The above, and other objects, features and advantages of the invention, will be apparent in the following detailed description of a preferred embodiment which is to be read with reference to the accompanying drawings.

BRIEF DESCRIPTION OF THE DRAWINGS

FIGS. 3A to 3I are waveforms to which reference will be made in explaining the operation of the apparatus of FIG. 2.

DETAILED DESCRIPTION OF THE PREFERRED EMBODIMENT

Figure 1:
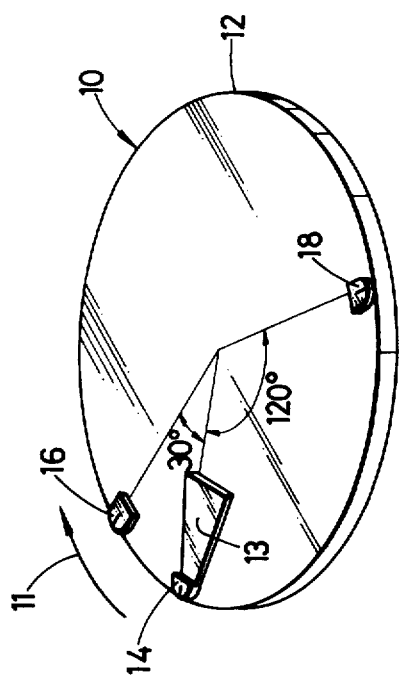
FIG. 1 is a perspective view of a rotary head assembly that is included in a recording and reproducing apparatus according to this invention.

Referring to FIG. 1, a rotary head assembly 10 according to the invention is there shown to have a rotary support or disc 12 on which there are mounted a main movable magnetic head 14, and two fixed magnetic heads 16 and 18. A 1.5-headed helical scan recording system of the Omega wrap type is employed for the rotary head assembly 10 of this embodiment. Such a recording system is described, for example, in U.S. Pat. No. 3,188,385 issued on Nov. 2, 1975 and herein incorporated by reference. In FIG. 1, the movable magnetic head 14 is supported at one end of a deflectable electromechanical transducing element, such as bi-morph leaf 13, and the other end of bi-morph leaf 13 is secured to rotary disc 12 with is rotated in the direction shown by an arrow 11. The bi-morph leaf 13 can be flexed or deflected to move head 14 thereon in the direction normal to the plane of rotation of disc 12. The fixed head 16 is disposed on rotary disc 12 so that it is angularly spaced from the main magnetic head 14 by a predetermined angle, suitably about 30 degrees, with respect to the central axis of the rotary disc 12. The fixed head 16 is used to record and reproduce vertical synchronizing signal portions of the successive fields of video signals, while the main movable magnetic head 14 is used to record and reproduce the remaining portions of the video signals.

According to this invention, the additional or auxiliary head 18 is fixed on rotary disc 12 and is angularly spaced from the main head 14 by a predetermined angle, suitably about 120 degrees with respect to the central axis of the rotary disc 12. The fixed head 18 is used exclusively to reproduce signals immediately following the recording thereof on a magnetic tape by mean head 14, and the output of head 18 is used to detect the optimum home position of the movable magnetic head 14 during the initial recording operation. The quality of the fixed reproducing head 18 does not need to be high when it is used only to detect the tracking information. However, if the fixed reproducing head 18 is also used to monitor the recorded signal, a higher quality head may be used.

The system is placed in the record (REC) or the play back (PB) mode by ganged mode selecting switches 20 and 22. Although dynamic tracking control systems operative during reproduction of the recorded signal are well-known in the art and do not, as such, form an inventive part of the present disclosure, a brief description of the illustrated tracking control for reproducing is included in the following for completeness of disclosure.

In the play back or reproducing mode, signals reproduced from the magnetic tape (not shown) by movable magnetic head 14 supported on the bi-morph leaf 13, and which are typically FM signals, are supplied through switch 22 to a reproducing amplifier 24. The amplified FM signals are applied to a demodulator 26 which demodulates the same and supplies the resulting demodulated video signal to an output terminal 28. The output of reproducing amplifier 24 is further supplied to an AM detector or envelope detector 30. The envelope of the FM reproduced signals from amplifier 24 is detected in envelope detector 30. The output signal of envelope detector 30 is supplied through a high pass filter 32 to a synchronous detector 34. Low frequency noise components of the envelope-detected signals are eliminated in the high pass filter 32.

Pulse signals PG optionally generated synchronously with the revolution of the rotary disc 12 by means well known in the art are supplied through an input terminal 38 to a reference frequency (fc) oscillator 36. The pulse signals PG are generated by a pulse generator (not shown) whenever the rotary disc 12 reaches a predetermined angular position at least once per revolution of the rotary head assembly 10. The output fc of reference frequency oscillator 36 is a multiple of the frequency of the pulse signals PG and is synchronized with the pulse signals PG. For example, in the preferred embodiment, when the rotary frequency of the rotary disc 12 is 60

Hz, the frequency of the output fc of the frequency oscillator 36 may be 720 Hz.

The waveform of the output fc of the reference frequency oscillator 36 is sinusoidal. The output of the reference frequency oscillator 36 is supplied through a phase delay circuit 40 and a high pass filter 42 to the synchronous detector 34. The output of the reference frequency oscillator 36 is delayed in the phase delay circuit 40 by a time equal to the time by which changes in the envelope of the reproduced signal from movable magnetic head 14 as a result of changes in the drive signal applied to bi-morph leaf 13, are delayed due to the mechanical response of the bi-morph leaf 13 and the resonance characteristics of the electrical circuit including the head 14. The high pass filter 42 has the same characteristic as the high pass filter 32.

The amplitude of the reproduced and envelope detected output signal of the high pass filter 32 is detected in synchronization with the phase of the output of reference frequency oscillator 36 by synchronous detector 34. The output of synchronous detector 34 is supplied to a trap circuit 44. The frequency component 2fc is eliminated from the output of synchronous detector 34 by trap circuit 44. The output of trap circuit 44 is supplied to an adder 80, where it is added to the output of the reference frequency oscillator 36. The output of the adder 80 is supplied as a drive voltage through the switch 20 to the bi-morph leaf 13 to deflect the latter.

The foregoing arrangement for effecting dynamic tracking control of head 14 when the VTR is in its reproducing mode is well-known as a wobbling or dithering control system and, accordingly, will not be described in any greater detail.

Figure 2:
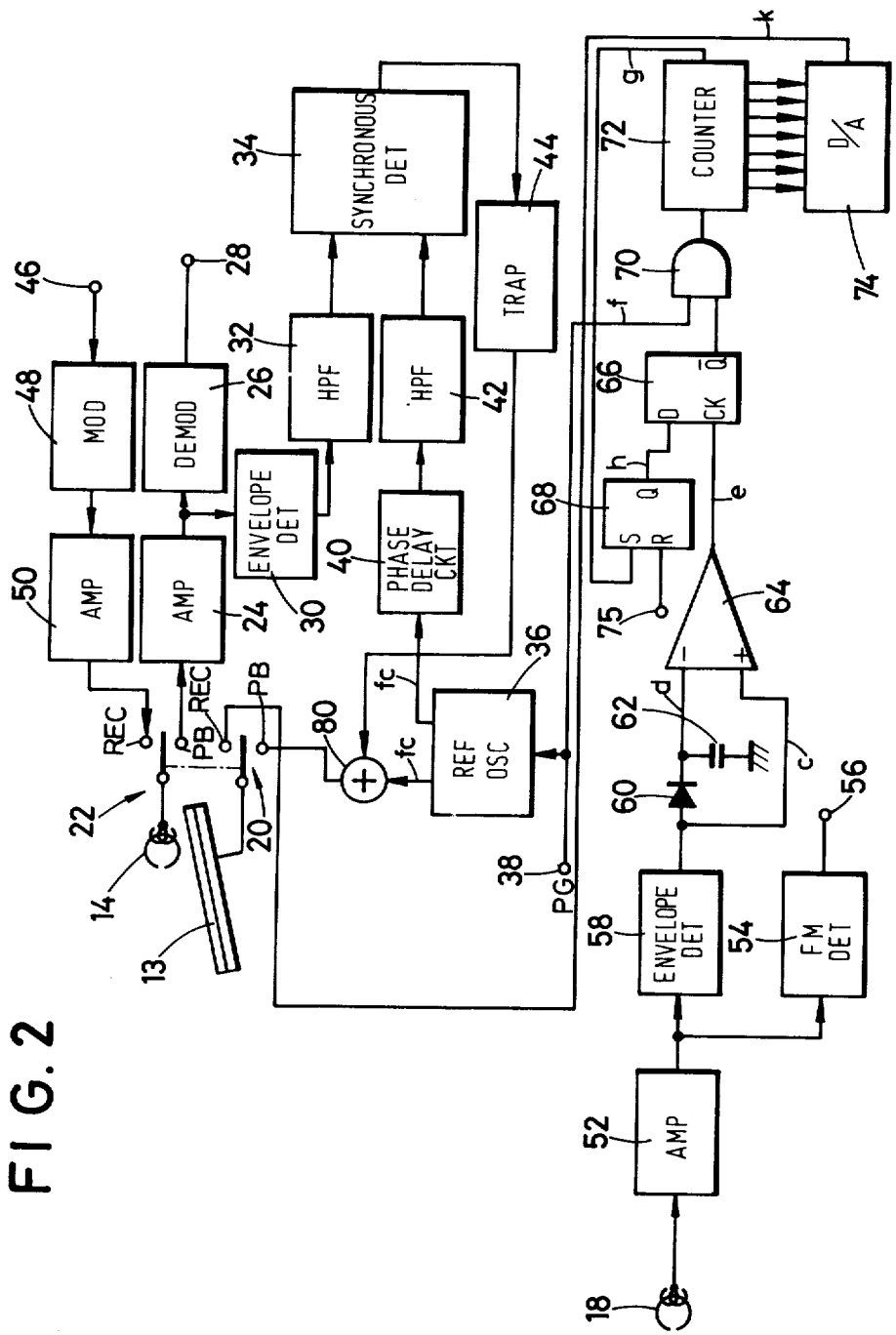
FIG. 2 is a block diagram of a recording and reproducing apparatus according to an embodiment of the invention.

In the recording mode of operation of the VTR, switches 20 and 22 are changed-over to engage their respective record contacts (REC), and video signals applied to an input terminal 46 are supplied through a modulator 48, a recording amplifier 50 and the switch 22 for recording on the magnetic tape by means of main head 14 supported by bi-morph leaf 13. During each recording of video signals by main head 14, the fixed auxiliary head 18 is operative to reproduce the just recorded video signals so that, as hereinafter described in detail, the output of auxiliary head 18 may be detected for determining the deviation of main head 14 from an optimum tracking position. More particularly, in the circuits shown on FIG. 2, the reproduced signals from auxiliary head 18 are, in the recording operation of the VTR, supplied through a reproducing amplifier 52 to an FM detector 54 by which the video signals being recorded by head 14 and immediately thereafter reproduced by head 18 are demodulated and applied to an output terminal 56. A suitable monitor (not shown) may be connected with terminal 56 so that the video signals being recorded can be simultaneously monitored.

The output of amplifier 52 is further shown to be supplied to an envelope detector 58 which detects the envelope of the output of head 18 and provides a corresponding detecting output. Such detecting output of envelope detector 58 increases as the actual position of movable recording-reproducing head 14 nears its ideal tracking position relative to the fixed position of auxiliary head 18, for example, as indicated at a on FIG. 3A. However, to the extent that the actual tracking position of movable head 14 deviates from the ideal tracking position a, for example, as indicated by the line b on FIG. 3A, then the envelope of the output of head 18 and the resulting detecting output of detector 58 will decrease, for example, as indicated by the line c on FIG. 3B. The output of envelope detector 58 is shown on FIG. 2 to be supplied to a comparator comprised of a diode 60, a peak level holding capacitor 62 and a differential amplifier 64. The peak level d (FIG. 3B) of the output c of envelope detector 58 is held at one terminal of differential amplifier 64 by capacitor 62, while the output c of the envelope detector is applied directly to the other terminal of differential amplifier 64 for comparison of the instantaneous value of the output of detector 58 with the held peak level d.

The resulting comparison output e (FIG. 3C) is applied from differential amplifier 64 to a clock input terminal CK of a D-type flip-flop 66. A R-S type flip-flop 68 has its Q-output connected to a data input terminal D of flip-flop 66, and flip-flop 68 is adapted to be reset in response to the application of a pulse to an input terminal 75 which is connected to a reset terminal R of flip-flop 68. An inverted or $\overline{Q}$-output of flip-flop 66 is connected to one input terminal of an AND circuit 70 which, at its other input terminal receives the pulses PG from terminal 38, and which are shown at f on FIG. 3D. As previously indicated, such pulses are suitably generated, for example, by means of a pulse generator (not shown) arranged on a rotary shaft of head assembly 10, so that one PG pulse f will be produced for each revolution of disc 12, that is, whenever one field (IV) of the video signals is recorded on the magnetic tape.

The output of AND circuit 70 is supplied to a count input terminal of a counter 72 which, as shown, may be of the 6-bit type. The count output of counter 72 is supplied to a digital-to-analog (D/A) converter 74, and the resulting analog output k (FIG. 3I) of converter 74 is supplied, as a drive voltage, through switch 20 to the bi-morph leaf 13 for deflecting the latter and thereby moving main head 14 in the direction normal to the plane of rotation of disc 12, that is, transverse to the direction along the track being scanned by head 14. A carrier signal g (FIG. 3E) issuing from counter 72, for example, when the latter has counted the 65th GP pulse, is applied to a set terminal S of flip-flop 68.

The above described arrangement according to this invention operates as follows:

With the recording mode of operation of the VTR having been selected, the optimum positioning of movable head 14 is initiated by a pulse signal suitably applied to start terminal 75. Such pulse applied to terminal 75 may be automatically generated each time the VTR is turned on in its recording mode or the pulse may be initiated by a special operator control. At the initiation of the recording operation, the counter 72 is reset so that the drive voltage k applied from D/A converter 74 to bi-morph leaf 13 is at its lowest or zero level and, accordingly, movable head 14 is at its extreme position to one side of the optimum position a, as shown on FIG. 3A.

The S-R flip-flop 68 is reset by the start pulse applied from terminal 75 to its reset terminal, and this removes from the D-input of flip-flop 66 the set output h previously obtained from S-R flip-flop 68. Therefore, D-type flip-flop 66 is reset and its output $\overline{Q}$ attains a relatively high level to enable the respective input of AND gate 70. Therefore, the pulses PG applied to terminal 38, and which indicate successive revolutions of rotary disc 12, as indicated at f on FIG. 3, are passes through AND gate 70 to counter 72. As such pulses are counted by counter 72, the output k (FIG. 3I) of D/A converter 74 increases in a step-wise manner with each revolution of disc 12, that is, with the recording to each field of video signals. In response to the application of the output k of D/A converter 74 to bi-morph leaf 13, the latter is similarly deflected in a step-wise manner so as to cause a first sweep of head 14 from one side of the optimum scanning position a to the opposite side of the optimum scanning position, for example, as indicated by the line b on FIG. 3A.

As head 14 records successive fields of video signals in respective successive parallel track sections which are skewed in respect to the direction of movement of the magnetic recording tape or other medium, the fixed auxiliary reproducing head 18 reproduces each field of video signals immediately after the recording thereof in the respective track section. As the main head 14 is deflected or moved transversely from an extreme position at one side of its optimum position to an extreme position at the opposite side of the optimum position, as indicated by the line B on FIG. 3A, the envelope of the reproduced output of fixed head 18 first increases to a peak value, occurring when the head 14 is in its optimum tracking position determined by the fixed position of head 18, and thereafter the detected output of head 18 progressively decreases, as indicated on c on FIG. 3B.

The deflection of the bi-morph leaf 13 by the drive voltage k from D/A converter 74 increases with time until a predetermined, for example, the 64th pulse PG is supplied through AND circuit 70 to counter 72. The counter 72 is reset by the 65th pulse PG, whereupon the drive voltage k from D/A converter 74 is returned to zero, as at the point p on FIG. 3I, with the result that head 14 is restored to its original extreme position.

During the first scan or sweep timed by the first 65 pulses PG applied to terminal 38, and during which head 14 records 65 fields of the vedio signals in 65 respective parallel track sections on the magnetic tape or other record medium, the peak value d (FIG. 3B) of the output of fixed head 18, as detected by envelope detector 58, is held by peak holding capacitor 62 at the corresponding input terminal of the differential amplifier or comparator 64.

When counter 72 is reset in response to the counting of the 65th pulse PG during the first sweep or scan, the resulting carry signal or bit g (FIG. 3E) is effective at the set input S of S-R flip-flop 68 to set the latter and thereby raise the Q-output thereof to its relatively high level, as indicated at h on FIG. 3F. The application of the relatively high level signal h to the D-input of D-type flip-flop 66 merely enables the latter, but does not change its inverted output $\bar{Q}$ which, as indicated at i on FIG. 3G continues at a relatively high level. Consequently, the output i of flip-flop 66 continues to enable AND circuit 70 with the result that the pulses PG from terminal 38 continue to pass through AND circuit 70, as indicated at j on FIG. 3H, and are counted by counter 72. As counter 72 counts such pulses from AND circuit 70, the drive voltage k from D/A converter 74 again rises in a step-wise manner to effect the second scan or sweep by head 14 on bi-morph leaf 13.

During such second sweep by head 14, the reproduced output from fixed head 18 is again envelope detected by detector 58 and the resulting detected output c (FIG. 3B) is supplied directly to comparator or differential amplifier 64 for comparison in the latter with the stored or held peak value d obtained during the first sweep.

When the detected output from fixed head 18 during the second sweep becomes equal to the held peak value of the detected output of head 18 during the first sweep, the resulting high level output e (FIG. 3C) from comparator 64 is effective at the clock input terminal CK of the previously enabled flip-flop 66 to set the latter and thereby remove the enable signal i from AND gate 70. Thus, AND gate 70 is closed to prevent the counting by counter 72 of any further pulses PG and the number stored in counter 72 remains fixed at the value, indicated at q on FIG. 3I, and which resulted in the drive voltage V causing movable head 14 to be disposed in its optimum tracking position, that is, the position at which the maximum output is obtained from fixed head 18. After the time indicated at q on FIGS. 3A and 3I, the position of movable head 14 is fixed for the remainder of the recording operation of the VTR.

If desired, a random access memory (RAM) may be provided for the long term storage of the number generated by counter 72 for achieving the optimum tracking position of head 14.

As previously noted, the reproduced output of auxiliary head 18 may be supplied to the FM detector 54 so that the output of the latter can operate a monitor (not shown) on which the just-recorded video signals can be visually observed. When such monitoring is not required, the fixed auxiliary head 18 may be constituted by a relatively inexpensive transducer as precise resolution of its reproduced output is not then required.

Since the same head 14 is employed for both recording and reproducing the video signals, the latter can be recorded and reproduced with good quality and without phase shifts.

Although an illustrative embodiment of the invention has been described in detail herein with reference to the accompanying drawings, it is to be understood that the invention is not limited to that precise embodiment, and that various changes and modifications can be effected therein by one skilled in the art without departing from the scope and spirit of the invention as defined in the appended claims.

What is claimed is:

1. An apparatus for recording signals on a recording medium, so that the signals thereby recorded lie in at least one track on said medium, comprising:
    signal recording means moving in one direction generally along the direction of said at least one track for recording said signals on said recording medium;
    deflectable means for deflecting said signal recording means normal to said one direction in response to a control signal;
    means for generating said control signal;
    means for finding, during commencement of the recording of said signals, the value of said control signal which produces substantial coincidence between the deflected position of said signal recording means and an optimum location of said at least one track; and
    means for storing said value of the control signal and applying the same to said deflectable means during recording subsequent to said commencement.

2. The apparatus according to claim 1; wherein said means for generating the control signal includes a counter and a D/A converter.

3. The apparatus according to claim 1; wherein said means for finding the value includes fixed reproducing means moving with respect to said recording medium in a path defining said optimum location of said track and which is operative to reproduce the signals just recorded by said signal recording means, means for varying said control signal in a first sweep from a first extreme to a second extreme, holding means for holding a maximum value of output of said fixed reproducing means during said first sweep, means for varying said control signal in a second sweep from said first extreme toward said second extreme, comparison means for comparing the instantaneous output of said fixed reproducing means with said maximum value during said second sweep, and maintaining means for stopping said second sweep when said instantaneous output and said maximum value are equal and for maintaining the signal recording means in the position at which said second sweep is stopped.

4. A video tape recorder for recording signals on a recording medium so that said signals lie along a track at a desired location on said recording medium comprising:
- a rotary head support having at least a main record head which travels across the medium for recording said signals thereon and an auxiliary reproduce head angularly spaced apart from said main record head for reproducing the signals recorded by the latter;
- an electro-mechanical transducer mounting said main record head on said rotary head support and which is operative to displace said main record head normal to said track;
- said auxiliary reproduce head being fixed on said rotary head support and trailing said main record head;
- the path of said auxiliary reproduce head along said recording medium defining the desired location of said track;
- sweep means for displacing said main record head on said electro-mechanical transducer in a first sweep normal to said track from a first extreme to a second extreme;
- memory means for storing the maximum output of said auxiliary reproduce head during said first sweep;
- said sweep means being further operative to displace said main record head on said electro-mechanical transducer in a second sweep normal to said track from one of said first and second extremes toward the other extreme; and
- means for stopping said second sweep and for holding said main record head in the position at which the instantaneous output of said auxiliary reproduce head during said second sweep equals the maximum output stored in said memory means during said first sweep.

5. An apparatus for recording a video signal on a moving recording medium comprising:
- signal recording means repeatedly scanning said recording medium for recording the video signal in successive parallel track sections which are skewed relative to the direction of the movement of said medium,
- flexible support means supporting said recording means and being responsive to values of a tracking control signal to displace said recording means in the transverse direction relative to the scanning path of said recording means;
- signal reproducing means repeatedly scanning said recording medium and generally following the recorded track sections formed by said general recording means, said signal reproducing means being maintained at a predetermined position which is fixed with respect to the direction transverse to the scanning path thereof, and
- control signal generating means for producing said tracking control signal in correspondence to the signal due to misalignment of said recording means relative to said fixed position of said signal reproducing means, said control signal generating means including signal processing means to produce a stopping control signal in response to the difference between a predetermined reference signal corresponding to said fixed position of said signal reproducing means and a varied signal corresponding to said mis-alignment of said signal recording means relative to said fixed position.

6. An apparatus according to claim 5, wherein said signal recording means is a magnetic head with an air-gap, and said flexible support means flexes in response to said tracking control signal to move said head in a direction along the length of said gap and substantially perpendicular to the longitudinal direction of said parallel tracks sections.

7. An apparatus according to claim 6, wherein said flexible support means for supporting said magnetic head is of piezo-ceramic material.

8. An apparatus according to claim 7, wherein said piezo-ceramic material is in the form of a bi-morph leaf which moves said magnetic head in either direction along the length of the gap.

9. An apparatus according to claim 5, wherein said signal processing means includes an envelope detector for detecting a signal level from said signal reproducing means, a peak hold circuit for holding a peak level of said signal level detected in said envelope detector, a comparator for comparing the peak signal level held by said peak hold circuit with the fluctuating signal level instantaneously produced by said envelope detector, and a circuit for producing said stopping control signal in response to the output of said comparator.

10. An apparatus according to claim 9, wherein said recording means is deflected beyond said predetermined fixed position of said signal reproducing means in a first sweep interval and said peak hold circuit holds the peak signal level occurring in said interval, and said comparator compares said held peak signal level with the fluctuating signal levels instantaneously produced in a second sweep interval to produce said output in said second sweep interval.

11. A method for establishing an optimum home position relative to a track for a movable magnetic recording head in a video tape recorder comprising the steps of:
- sweeping said movable magnetic recording head in a first sweep normal to said track from a first extreme on one side of said track to a second extreme on the second side of said track;
- recording signals on a magnetic recording medium moving with respect to said magnetic recording head during said first sweep;
- reproducing the recorded signals with a reproducing head which trails said magnetic recording head and which is fixed in the direction normal to said track, the path of said reproducing head defining said track;

holding the maximum value of the signals reproduced by the fixed head during said first sweep;

sweeping said movable magnetic recording head in a second sweep normal to said track from said first extreme toward said second extreme;

comparing the instantaneous value of the reproduced signal from the fixed head during said second sweep with the maximum value from said first sweep;

stopping said second sweep at a home position when the value of reproduced signal during said second sweep equals said maximum value from said first sweep; and maintaining said movable magnetic recording head in said home position during subsequent recording.

* * * * *